March 21, 1939.  S. C. EWING  2,151,093
CONTROL SYSTEM FOR SYNCHRONOUS MACHINES
Filed June 10, 1938
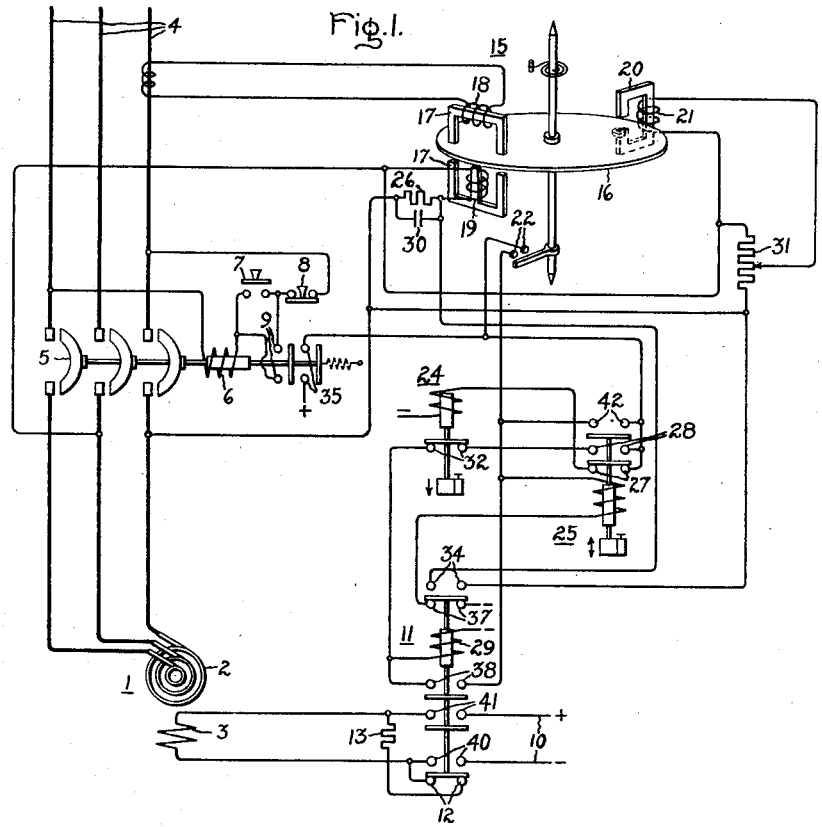
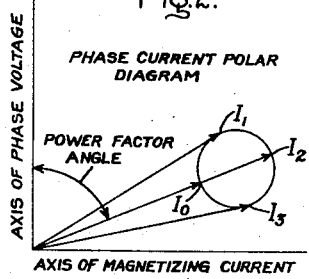
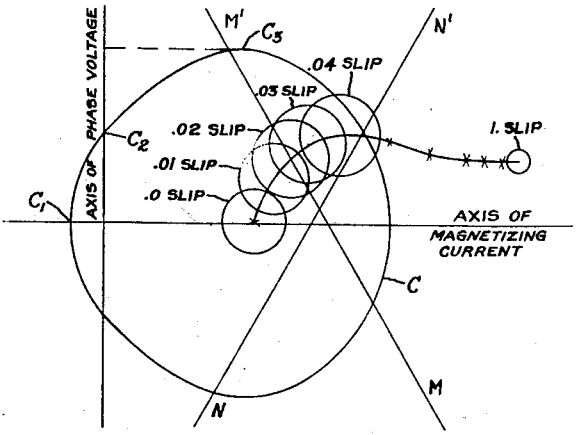
Inventor:
Samuel C. Ewing,
by Harry E. Dunham
His Attorney.

Patented Mar. 21, 1939

2,151,093

UNITED STATES PATENT OFFICE 2,151,093

CONTROL SYSTEM FOR SYNCHRONOUS MACHINES

Samuel C. Ewing, Scotia, N. Y., assignor to General Electric Company, a corporation of New York Application June 10, 1938, Serial No. 212,992

9 Claims. (Cl. 172—289)

My invention relates to control systems for synchronous machines and particularly to a system for controlling predetermined connections of a synchronous motor, synchronous condenser, synchronous converter or the like.

One object of my invention is to provide an improved arrangement of apparatus for effecting a predetermined connection of a synchronous machine at predetermined optimum points in the slip cycle of the machine when it is operating subsynchronously as an induction machine.

Another object of my invention is to provide an improved arrangement of apparatus for effecting the connection of a synchronous motor field winding to a source of excitation only at predetermined definite points in the slip cycle of the motor where the motor develops a desired pull-in torque.

An additional object of my invention is to provide an improved arrangement of apparatus for controlling the connection of a synchronous motor field winding to a source of excitation in accordance with the current pulsations produced in the armature circuit of the motor when it is operating as an induction motor so that the excitation of the field winding is effected at predetermined definite points in the slip cycle when the motor reaches a predetermined speed.

My invention will be better understood from the following description when taken in connection with the accompanying drawing, and its scope will be pointed out in the appended claims.

In the accompanying drawing, Fig. 1 diagrammatically illustrates a control system for a synchronous motor embodying my improved field excitation control system, and Figs. 2 and 3 are explanatory diagrams.

Referring to Fig. 1 of the accompanying drawing, 1 represents a synchronous motor having an armature winding 2 and a field winding 3. In order to simplify the disclosure, I have shown my invention in connection with a full voltage starting system whereby the motor is started as an induction motor by connecting the motor armature winding 2 directly to the alternating current supply circuit 4 while the field winding 3 of the motor 1 is short-circuited through a suitable discharge resistance 13. It is to be understood, however, that my invention is not limited to any particular arrangement for energizing the armature winding of the motor during the starting operation thereof. As shown in the drawing, the armature winding 2 is arranged to be connected directly to the alternating current supply circuit 4 by means of a suitable switch 5 having a closing coil 6 that is arranged to be connected across one phase of the supply circuit 4 when a suitable control switch 7 is closed. This control switch 7 is shown as a manually operated device, but it will be obvious to those skilled in the art that it may be automatically controlled in any suitable manner so that it is closed when it is desired to start the motor 1. In the circuit of the closing coil 6, I also provide the normally closed contacts of a switch 8 which may be controlled in any suitable manner so that its contacts are opened when it is desired to stop the motor. The switch 5, when closed, completes through its auxiliary contacts 9 a locking circuit for the closing coil 6 so that, after the switch 5 is closed, the starting control switch 7 may be opened without effecting the opening of the switch 5.

The field winding 3 of the motor 1 is arranged to be connected to a suitable source of excitation 10 by means of a field switch 11 when it is closed. When the switch 11 is open, which is the position in which it is shown in the drawing, its auxiliary contacts 12 connect the discharge resistor 13 across the terminals of the field winding 3.

In accordance with my invention, I provide in the embodiment shown in the drawing, an improved arrangement of apparatus for controlling the closing of the field switch 11 in response to predetermined characteristics of the current pulsations produced in the motor armature circuit when it is operated as an induction motor so that the field switch 11 is closed only at one or the other of two predetermined definite points in the slip cycle after the motor has accelerated to a predetermined speed as an induction motor.

When an unexcited salient pole synchronous motor is operating subsynchronously as an induction motor, the effective impedance of the motor primary winding varies during each half cycle of slip over a range which is different for each motor speed. This variation in effective impedance is due to the changes in reluctance of the motor magnetic circuit resulting from the movement of the salient field poles relatively to the poles of the rotating magnetic field set up by the current in the motor primary winding. The reluctance of the motor magnetic circuit varies with the angular displacement between the axes of the salient field poles and the poles of the rotating magnetic field produced by the current in the armature winding, so that during each half cycle of slip while the unexcited salient field poles are slipping the distance between the axes of adjacent poles, produced by the primary current, the reluctance of the motor magnetic circuit oscillates between a minimum value and a maximum value. The effect of these changes in reluctance on the motor armature current will be seen more clearly from Fig. 2 which is a polar diagram of a phase current. In this Fig. 2, the vector $I_0$ represents the motor primary current at a given motor slip when a predetermined angular relation exists between the axes of the armature and field poles; the vector $I_1$ represents the motor primary current at the same slip when the angular displacement between the poles has been increased 45°; the vector $I_2$ represents the motor primary current at the same slip when the angular displacement of the rotor poles has been increased another 45° or a total of 90° and the vector $I_3$ represents the motor primary current at the same slip when the angular displacement of the rotor poles has been increased another 45° or a total of 135° from the angular position which produced the current represented by $I_0$. The curve $I_0$, $I_1$, $I_2$, $I_3$ represents the locus of the ends of the primary current vectors during each half cycle of slip of the motor at a given slip so that each point on this curve represents the primary current at a definite point in each half cycle of slip. From this curve, it will be seen that, during each half cycle of slip, the magnitude and also the phase angle of the primary current vary over predetermined ranges. These ranges, however, vary with the slip of the motor as will be seen more clearly from a similar diagram in Fig. 3 in which the various circles represent the loci of the primary current vectors of a motor at a number of different subsynchronous speeds. From this Fig. 3, it will be seen that, when the motor is operating at those speeds from which it can be synchronized while driving a heavy load, such as in the neighborhood of 97 to 98% of synchronous speed, the minimum value of primary current reached while the motor is operating at 98% speed is not sufficiently less than the minimum value reached at 97% speed to control accurately a relay which operates only in response to the current decreasing below a specific current value. Similarly, the maximum and minimum angles of lag of the primary current at these two values of motor speed are not sufficiently different to control accurately a relay which responds only to current having a predetermined phase angle. However, due to the difference in slip at these two speeds, the length of time the current is below a predetermined value, or lags a predetermined amount, is at least 50% longer when a motor is operating at 2% slip than at 3% slip. Therefore, by combining suitable timing means with a relay which depends for its operation on the occurrence of a predetermined characteristic of the primary current at the desired slip from which the motor is to be synchronized, the resulting combination is a very sensitive slip responsive arrangement which will effect the application of excitation to the motor field winding at either of two definite points in the slip cycle which are substantially 180° or a half slip cycle apart. The reason there are two points substantially 180° apart is because there is a pulsation in the armature current each time the unexcited field poles slips one pole pitch with respect to the rotating armature field poles.

While it is possible to measure the speed of the motor by an arrangement of apparatus which responds to the motor armature current remaining below a predetermined value for a predetermined time, I employ in the present embodiment of my invention the relay arrangement disclosed in the copending application of H. T. Seeley, Serial No. 153,953, filed July 16, 1937, and assigned to the same assignee as this application. In this Seeley arrangement, a single wattmetric type of impedance relay controls the application and removal of field excitation. As shown in Fig. 1 of the accompanying drawing, the impedance relay 15 has a rotatable member 16 and a cooperating wattmetric driving element 17 that includes a current winding 18 energized in response to the current in one of the phase conductors supplying current to the motor armature current 2 and a voltage winding 19 connected in series relation with the parallel connected capacitor 30 and resistor 26, across one of the phases of the supply circuit 4. The driving element 17 exerts on the movable member 16 a torque in a direction to open the contacts 22 proportional to $EI \sin(\theta-\phi)$ where E represents the supply circuit voltage applied to the circuit of the voltage winding 19, I represents the current in the supply circuit conductor to which the current winding 18 is connected, $\theta$ represents the power factor angle or the angle by which the current I lags behind its phase voltage, and $\phi$ represents the angle by which the current in the voltage winding 19 lags behind the current I when $\theta$ is zero, that is, when I is at unity power factor. Therefore, since $$I = \frac{E}{Z}$$

the wattmetric device 17 produces a torque proportional to $$\frac{E^2}{Z}\sin(\theta-\phi)$$

where Z represents the impedance of the circuit through which the current I flows.

The rotatable member 16 is also provided with another driving element 20 which has a voltage winding 21 connected by #5 to one of the phases of the supply circuit 4 and which is designed so as to exert a torque on the rotatable element 16 in a direction to close the contacts 22. As shown in the drawing, the voltage winding 21 is connected to the same phase of the supply circuit 4 to which the voltage winding 19 of the wattmetric device 17 is connected so that the torque exerted by the driving element 20 is proportional to $KE^2$, where K represents a constant. The torque exerted by the element 20 may be adjusted by means of a suitable potentiometer 31 which modifies the value of K. Therefore, the resultant torque exerted on the movable element 16 by the two driving elements 17 and 20 is proportional to $$\frac{E^2}{Z}X\sin(\theta-\phi)-KE^2 \text{ or } E^2\left[\frac{\sin(\theta-\phi)}{Z}-K\right]$$

Since the relay is designed so that its inertia is very small and also has substantially no spring restraint, its position depends mainly on the algebraic sign of $$\frac{\sin(\theta-\phi)}{Z}-K$$

Therefore, it will be seen that the operation of the relay 15 is not effected by normal changes in the magnitude of the supply circuit voltage and its operation varies with the impedance of the motor armature circuit 2.

By varying the relative phases of the currents in the windings 18 and 19 of the relay 15 in any well known manner, as for example by varying the electrical constants of the circuit of one or both of the windings 18 and 19, the zero torque characteristic, which is substantially a straight line, can be made to have any desired slope and by varying by means of the potentiometer 31, the torque exerted by the driving element 20, the distance of this zero torque characteristic from the origin can be adjusted to any desired value. If the relay 15 is adjusted so that it has a zero torque characteristic represented by the line MM' in Fig. 3, the relay 15 maintains its contacts 22 open whenever the magnitude and phase angle of the primary current is such that the current vector terminates at the right of the line MM' and closes its contacts 22 whenever the magnitude and phase angle of the primary current is such that the current vector terminates at the left of the line MM'. It will be seen that with this relay characteristic the motor speed has to increase to nearly 97% of synchronous speed before the primary current pulsations are of such a character that the relay 15 will close its contacts 22 during any portion of a primary current pulsation. By having the closing of the contacts 22 initiate the timing operation of a suitable timing device such as a definite time relay 25 which has adjustable definite pick up and drop out times of operation, the timing device can complete its timing operation only when the motor speed has increased to such a value that the primary current vector remains to the left of the zero torque characteristic MM' for a predetermined definite time.

The timing means, therefore, will complete its timing operation only after the motor slip has decreased to a predetermined value. Furthermore, it will complete its timing operation only at a definite point during the pulsation of primary current which occurs at that slip and which corresponds to a definite point in each half cycle of slip and therefore only at two definite angular positions of the salient field poles relative to the poles produced by the primary current. Consequently, with the arrangement shown in Fig. 1, when the motor reaches a predetermined speed as an induction motor, the relay 25 will open its contacts 27 at either of two definite points in the slip cycle. These two definite points in the slip cycle are substantially 180° apart so that excitation may be applied at two different angles substantially a half slip cycle apart. In order that excitation may be applied at the two most favorable or optimum angles which are a half cycle apart, I provide in accordance with my invention an adjustable definite timing device, such as an adjustable time drop out relay 24 which is set into operation by opening of the contacts 27 of the time relay 25 when it completes its timing operation and which, after being in operation for a definite time, effects the closing of the field switch 11.

In order to effect the opening of the field switch 11 in response to the motor falling out of synchronism, the connections of the relay 15 are changed in response to the closing of the field switch 11 so that while it is closed the relay 15 has a different zero torque characteristic such as NN' in Fig. 3 whereby the contacts 22 of the relay 15 are maintained closed as long as the motor is in synchronism and are opened immediately after the motor falls out of synchronism. Also, the connections of the closing coil 29 of the field switch 11 are changed so that while the field switch 11 is closed the energization of the closing coil 29 depends upon the contacts 22 being closed.

If in Fig. 3 the large circle C represents the locus of the motor primary current vector at synchronous speed with normal excitation and normal voltage applied to the primary winding and the portion $C_1C_2$ of the circle C represents the range over which the primary current of a unity power factor motor varies between no load and full load, it is apparent that as the motor load increases beyond the full load value, the magnitude and phase angle of the primary current vary so as to increase the torque of the motor until a maximum power point $C_3$ is reached when the motor falls out of step. Beyond this point the armature current continues to increase until finally the magnitude and phase angle of the primary current vector are such that it crosses the zero torque characteristic NN' thus causing the relay 15 to open its contacts 22.

In the arrangement shown in the drawing, the desired zero torque characteristic of the relay 15 for effecting the removal of field excitation when the motor falls out of synchronism is obtained by having the contacts 34 of the field switch 11, when it is in its closed position, complete a short-circuit around the parallel-connected resistor 26 and capacitor 30 in the circuit of the voltage winding 19 of the relay 15.

The operation of the embodiment of my invention shown in Fig. 1 is as follows: When it is desired to start the motor 1, the control switch 7 is closed to complete through the contacts of the control switch 8 an energizing circuit for the closing coil 6 of the switch 5. The closing of the switch 5 connects the armature winding of the motor 1 directly across the supply circuit 4 so that the motor starts and accelerates as an induction motor. During the starting operation of the motor, a circuit is completed for the motor field winding 3 through the discharge resistor 13 and the contacts 12 of the field switch 11. By closing its contacts 35, the switch 5 completes through contacts 27 of relay 25 an energizing circuit for relay 24 so that this relay immediately opens its contacts 32.

From Fig. 3 it will be seen that when the motor is operating at a high slip the magnitude and phase angle of the primary current are such that the loci of the armature current pulsations are entirely to the right of the zero torque characteristic MM' so that the relay 15 maintains its contacts 22 open continuously, and it is not until the motor reaches a speed near synchronous speed that the locus of an armature current variation crosses the zero torque characteristic. MM' so that the relay 15 closes its contacts 22 for a short time during each half slip cycle. Each time the contacts 22 are closed a circuit is completed through the contacts 35 of the switch 5 and the contacts 37 of the switch 11 for the time relay 25. However, the relay 25 is not continuously energized for a sufficient length of time to open its contacts 27 and close its contacts 28 and 42 until the motor slip has decreased to such a value that the length of time the armature current vector remains to the left of the zero torque characteristic MM' is equal to the operating time of the time relay 25. Since a decrease in the motor slip not only causes a greater portion of the locus of an armature current variation to fall to the left of the zero torque characteristic but also increases the time required for a current pulsation to take place, it will be seen that the relay 25 is very sensitive to a predetermined motor slip. When the time relay 25 is energized for a sufficient length of time to complete its timing operation, the closing of its contacts 42 completes a shunt circuit around the contacts 22 of relay 15 so that the energizing circuit of relay 25 remains completed until the field switch 11 opens its contacts 37. By opening its contacts 27, the relay 25 deenergizes the winding of relay 24. After the relay 24 has been deenergized a definite length of time which depends upon its adjustment, it closes its contacts 32 and completes through the contacts 28 of relay 25 and contacts 35 of switch 5 an energizing circuit for the closing coil 29 of the field switch 11. By closing its main contacts 40 and 41 and opening its contacts 12, the field switch 11 connects the field winding 3 to the source of excitation 10 and disconnects the discharge resistor 13 from across the terminals of the field winding. By closing its contacts 38, the field switch 11 completes a locking circuit for its closing coil 29 through the contacts 22 of the relay 15 and the contacts 35 of the switch 5. By opening its contacts 37, the field switch 11 opens the energizing circuit for the time relay 25. After the relay 25 has been deenergized for a predetermined time which is long enough to allow the motor to pull into synchronism and the primary current to reach its steady value, relay 25 opens its contacts 28 in the original energizing circuit of the closing coil 29 of the field switch 11. By closing its contacts 34, the field switch 11 changes the constants in the circuit of the coil 19 of the relay 15 so as to change the zero torque characteristic of the relay from MM' to NN'.

As long as the motor remains in synchronism, the magnitude and phase angle of the motor armature current are such that the current vector in Fig. 3 remains on the left hand side of the zero torque characteristic NN' within the portion $C_1C_3$ of the curve C so that the relay 15 maintains its contacts 22 closed. When, however, the motor is pulled out of synchronism, the magnitude and phase angle of the motor armature current change so that the current vector in Fig. 3 crosses to the right hand side of the zero torque characteristic NN'. Consequently, the torque of the relay 15 reverses so that the relay opens its contacts 22 and effects the deenergization of the closing coil 29 of the field switch 11. The field switch 11 immediately moves to its open position thereby disconnecting the field winding 3 from the source of excitation 10 and reconnecting the discharge resistor 13 across the terminals of the field winding 3. By closing its contacts 37, the field switch 11 prepares the heretofore described energizing circuit for the relay 25. The opening of contacts 34 of field switch 11 changes the zero torque characteristic of relay 15 from NN' to MM'.

After the motor pulls out of synchronism, it continues to operate as an induction motor until the speed of the motor again increases to a value sufficiently high to cause the time relay 25 to complete, in the manner heretofore described, its timing operation and thereby effect the operation of the time relay 24 to reestablish the closure of the field switch 11 at one of two predetermined optimum points in the slip cycle.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a system of the type described including a synchronous machine of the type in which pulsations are produced in the armature current thereof when the machine is operating as an induction motor at subsynchronous speeds near synchronous speed, and a source of alternating current connected to the armature winding of said machine, of means for establishing a predetermined electrical connection of the field winding of said machine at either of two optimum 180° displaced points in the slip cycle when the machine reaches a predetermined speed as an induction motor including timing means having an adjustable definite timing operation, means dependent upon a predetermined function of the voltage of said source and armature current of said machine for initiating the timing operation of said timing means at either of two definite points in the slip cycle substantially 180° apart when the slip of the machine decreases to a predetermined value, and means responsive to said timing means completing its definite timing operation for establishing said predetermined field connections of said machine.

2. In a system of the type described including a synchronous machine of the type in which pulsations are produced in the armature current thereof when the machine is operating as an induction motor at subsynchronous speeds near synchronous speed and a source of alternating current connected to the armature winding of said machine, of means for establishing a predetermined electrical connection of said machine at either of two optimum 180° displaced points in the slip cycle when the machine reaches a predetermined speed as an induction motor including timing means having an adjustable definite time of operation, means responsive to a predetermined characteristic of the armature current pulsations for initiating the timing operation of said timing means at either of two definite points in the slip cycle substantially 180° apart when the slip of the machine decreases to a predetermined value, and means responsive to said timing means completing its definite timing operation for establishing the predetermined electrical connection of said machine.

3. In a system of the type described including a synchronous machine of the type in which pulsations are produced in the armature current thereof when the machine is operating as an induction motor at subsynchronous speeds near synchronous speed, a source of alternating current connected to the armature winding of said machine, and a source of excitation, of means for connecting said source of excitation to the field winding of said machine at a predetermined point in the slip cycle when the machine reaches a predetermined speed as an induction motor including a time relay having a definite operating time when energized, means for energizing said time relay only during that portion of each armature current pulsation when a predetermined characteristic of the armature current exists, a second time relay having an adjustable definite operating time, means responsive to said first mentioned time relay completing its timing operation for initiating the operation of said second time relay and for completing a locking circuit for said first mentioned time relay which is independent of said armature current responsive means, and means responsive to said second time relay completing its timing operation while said first mentioned time relay is in its operated position for effecting the connection of said source of excitation to the field winding of said machine.

4. In a system of the type described including a synchronous machine of the type in which pulsations are produced in the armature current thereof when the machine is operating as an induction motor at subsynchronous speeds near synchronous speed, a source of alternating current connected to the armature winding of said machine, and a source of excitation, of means for connecting said source of excitation to the field winding of said machine at predetermined optimum points in the slip cycle when the machine reaches a predetermined speed as an induction motor including a time relay having a definite operating time when energized, means for energizing said time relay only during that portion of each armature current pulsation when a predetermined characteristic of the armature current exists, a second time relay having an adjustable definite operating time, means responsive to said first mentioned time relay completing its timing operation for initiating the operation of said second time relay and for completing a locking circuit for said first mentioned time relay which is independent of said armature current responsive means, and means responsive to said second time relay completing its timing operation while said first mentioned time relay is in its operated position for effecting the connection of said source of excitation to the field winding of said machine, and means responsive to the connection of said source of excitation to the field winding of said machine for effecting the restoration of said first mentioned time relay to its normal position after a predetermined time interval and for maintaining said field winding connection independently of the position of said first mentioned time relay.

5. In combination, a source of alternating current, a synchronous machine of the type in which pulsations are produced in the armature current thereof when the machine is operating as an induction motor at subsynchronous speeds near synchronous speed, switching means for connecting said armature winding to said source, a source of excitation, switching means for connecting said source of excitation to the field winding of said machine, a closing coil for said last mentioned switching means, a normally deenergized relay having a time delay pick up and drop out, a second normally deenergized relay having an instantaneous pick up and time delay drop out, means responsive to the closing of said first mentioned switching means for completing an energizing circuit for said second relay, a relay responsive to a predetermined characteristic of the armature current of said machine for completing an energizing circuit for said first mentioned time relay, means responsive to said first mentioned time relay completing its timing operation when energized for completing a locking circuit for itself independently of said armature current responsive relay and for deenergizing said second time relay, means controlled by said time relays for completing an energizing circuit for said closing coil when said first mentioned time relay is in its energized position and said second time relay is in its normally deenergized position, and means responsive to the closing of said second mentioned switching means for completing a holding circuit for said closing coil independently of the position of said first mentioned time relay and for deenergizing said first mentioned time relay.

6. In combination, a source of alternating current, a synchronous machine of the type in which pulsations are produced in the armature current thereof when the machine is operating as an induction motor at subsynchronous speeds near synchronous speed, switching means for connecting said armature winding to said source, a source of excitation, switching means for connecting said source of excitation to the field winding of said machine, a closing coil for said last mentioned switching means, a normally deenergized relay having a time delay pick up and drop out, a second normally deenergized relay having an instantaneous pick up and time delay drop out, means responsive to the closing of said first mentioned switching means for completing an energizing circuit for said second relay, a relay responsive to a predetermined characteristic of the armature current of said machine for completing an energizing circuit for said first mentioned time relay, means responsive to said first mentioned time relay completing its timing operation for completing a locking circuit for itself independently of said armature current responsive relay and for deenergizing said second time relay, means controlled by said time relays for completing an energizing circuit for said closing coil when said first mentioned time relay is in its energized position and said second time relay is in its normally deenergized position, means responsive to the closing of said second mentioned switching means for changing the connections of said armature current responsive relay so that it responds to a characteristic of said armature current which is indicative of said machine falling out of synchronism and for transferring the connections of said closing coil so that its energization depends upon the position of said armature current responsive relay.

7. An arrangement for controlling the connections between a source of excitation and the field winding of a synchronous machine whose armature winding is connected to a source of alternating current including a switch adapted to connect the source of excitation to the field winding of the machine, a closing coil for said switch, an energizing circuit for said closing coil, a locking circuit for said closing coil, a time relay having contacts in said energizing circuit which are closed after said relay has been energized for a predetermined time, an energizing circuit for said relay, contacts in said holding circuit and said relay circuit, and means responsive to a predetermined function of the voltage of the source connected to the armature winding and of the armature current for closing said last mentioned contacts when the phase and magnitude of the armature current are simultaneously within predetermined ranges.

8. An arrangement for controlling the connections between a source of excitation and the field winding of a synchronous machine whose armature winding is connected to a source of alternating current including a switch adapted to connect the source of excitation to the field winding of the machine, a closing coil for said switch, an energizing circuit for said closing coil, a locking circuit for said closing coil, a time relay having contacts in said energizing circuits which are closed after said relay has been energized for a predetermined time, an energizing circuit for said relay, normally closed contacts in said relay circuit controlled by said switch whereby they are open when said switch is closed, normally closed contacts in said holding circuit and said relay circuit, and means dependent upon the armature current being simultaneously within predetermined phase and magnitude ranges for closing said last mentioned contacts.

9. An arrangement for controlling the connections between a source of excitation and the field winding of a synchronous machine whose armature winding is connected to a source of alternating current including a switch adapted to connect the source of excitation to the field winding of the machine, a closing coil for said switch, an energizing circuit for said closing coil, a locking circuit for said closing coil, a time relay having contacts in said energizing circuits which are closed after said relay has been energized for a predetermined time, an energizing circuit for said relay, normally closed contacts in said relay circuit controlled by said switch whereby they are open when said switch is closed, normally closed contacts in said holding circuit and said relay circuit, means dependent upon the armature current being simultaneously within predetermined phase and magnitude ranges for closing said last mentioned contacts, and means controlled by the position of said switch for causing said armature current dependent means to respond to different simultaneous phase and magnitude ranges when said switch is open than when it is closed.

SAMUEL C. EWING.